United States Patent
McGuire et al.

(10) Patent No.: US 12,481,730 B1
(45) Date of Patent: Nov. 25, 2025

(54) METHOD FOR PERFORMING AUTOMATED SYSTEMATIC ENTITLEMENT REVIEW

(71) Applicant: MORGAN STANLEY SERVICES GROUP INC., New York, NY (US)

(72) Inventors: James McGuire, New York, NY (US); Olakunle Ogunrewo, Ottawa (CA); Pavithra Jois, Bangalore (IN); Anuprita Bhatt, Bangalore (IN); Rahul Sharma, Bangalore (IN)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/932,407

(22) Filed: Oct. 30, 2024

(51) Int. Cl.
| | |
|---|---|
| *G06F 21/00* | (2013.01) |
| *G06F 21/10* | (2013.01) |
| *G06F 40/00* | (2020.01) |
| *G06N 20/00* | (2019.01) |
| *H04L 9/40* | (2022.01) |
| *G06F 40/20* | (2020.01) |

(52) U.S. Cl.
CPC .......... *G06F 21/1076* (2023.08); *G06F 40/20* (2020.01); *G06F 2221/2103* (2013.01); *G06N 20/00* (2019.01); *H04L 9/40* (2022.05)

(58) Field of Classification Search
CPC .................. G06F 21/1076; G06F 40/20; G06F 2221/2103; G06N 20/00; H04L 9/40
See application file for complete search history.

(56) References Cited

U.S. PATENT DOCUMENTS

| | | |
|---|---|---|
| 11,196,775 B1 | 12/2021 | Badawy et al. |
| 11,516,299 B1 * | 11/2022 | Amir-Siddiqi ........... G06N 7/01 |
| 2012/0047575 A1 * | 2/2012 | Baikalov ............... G06F 21/604 726/21 |
| 2012/0246098 A1 | 9/2012 | Chari et al. |
| 2013/0239171 A1 * | 9/2013 | Ramesh .............. H04L 63/0263 726/1 |
| 2021/0142209 A1 * | 5/2021 | Patil ........................ H04L 63/20 |
| 2021/0406391 A1 | 12/2021 | Philip et al. |

OTHER PUBLICATIONS

"Entitlement Owner Tasks"—Backstage, ForgeRock, Aug. 1, 2021 https://backstage.forgerock.com/docs/autonomous-identity/2021.8.1/users-guide/chap-entitlement-owner-tasks.html (Year: 2021).*
"User Entitlement Review Explained"—Tiffany Sexton, Netwrix Community, Oct. 8, 2021 https://ptoweb.uspto.gov/patents/classification-resources/cpc/html/cpc-G06F.html#G06F12/1416 (Year: 2021).*

* cited by examiner

*Primary Examiner* — Randy A Scott
(74) *Attorney, Agent, or Firm* — Weitzman Law Offices, LLC (57) ABSTRACT

A computer-implemented method and system for performing automated systematic entitlement review is disclosed. The method comprises retrieving metadata concerning the one or more entitlements and the one or more users having those entitlements; selecting a first one or more instances of an entitlement and its user for revocation, and a second one or more instances of an entitlement and its user to be retained without revocation; automatically revoking access of the entitlements in the first one or more instances; and automatically notifying the users in the first one or more instances of the automatic revocation. In one family of variants, revocations are performed via probabilistic sampling, while in another family of variants, revocation are performed based on a "use it or lose it" scheme.

18 Claims, 8 Drawing Sheets

METHOD FOR PERFORMING AUTOMATED SYSTEMATIC ENTITLEMENT REVIEW

FIELD OF INVENTION

This disclosure relates to methods and system architectures in the field of information security/cybersecurity, and more specifically, to a method for identifying unnecessary security vulnerabilities created by allowing authorized users of an electronic system greater access than is necessary to perform their roles.

BACKGROUND

Many secure computing systems, such as those used by organizations and governments, assign each of their many users' accounts various software entitlements, either individually or as part of one or more established roles. For example, an entitlement may permit a user or class of users to read, write, or modify files within a particular folder or records within a particular database. It may permit a user or class of users to access a particular application programming interface (API) or web application. It may permit a user or class of users to approve steps in workflow management software or to generate messages or commands to be sent to other devices within a network architecture.

A software entitlement may be genuinely needed for a particular user to perform various assigned duties at a particular moment in time, but it is also possible that as software dependencies change, network architectures change, or assigned duties change, an entitlement may no longer be needed by a particular user. Every unnecessary entitlement represents a possible security risk, whether from a disgruntled user using it for sabotage or corporate espionage, or a negligent user accidentally affecting critical systems outside of their area of personal competence, or a malicious actor obtaining the user's credentials and acting without the user's knowledge.

Consequently, it is a good security practice to periodically determine whether any given entitlement granted to a user in the past is still necessary for the user in the present, and if not, to revoke it and close the possible security hole. Existing entitlement review generally entails a human analyst using their own knowledge of a system's structure and an individual's duties to determine which entitlements are still needed by each user. Such a process is time-consuming, prone to human error, and diverts human labor and attention from more productive pursuits or analyses. Even when automated machine learning is used to replace a human in this context, the training data is likely to suffer from the same problem—users are over-entitled compared to the ideal—and thus an automated agent is likely to be insufficiently aggressive.

Thus, there are advantages to developing novel methods to determine whether continued access to entitlements is justified, with the goals of minimizing human workload and possibility of human error, while also not relying on faulty data sets to make decisions.

BRIEF SUMMARY OF THE INVENTION

In order to address the limitations of previous systems in this field, new methods of performing systematic entitlement review are disclosed. These methods fall under two broad conceptual categories: probabilistic sampling entitlement revocation, and "use it or lose it" entitlement revocation. In a probabilistic sampling method, entitlements are each assigned a probability of revocation per unit of time, and periodically, a sample of the entitlements are "soft-revoked". The entitlements are marked for imminent revocation unless the user affirmatively challenges the revocation and asserts a continued need for the entitlement. In the "use it or lose it" method, use of entitlements are tracked, with entitlements automatically being revoked after an interval of time without use—for example, if six months pass by without logging into a particular web app. Both methods may also be used in parallel, such that a probabilistic revocation may occur at some point in time, and is also certain to eventually occur if the entitlement is never used by its owner; or alternatively, such that a revocation will never occur if the entitlement is routinely used, but may be probabilistically revoked at some point if it falls into disuse.

The disclosed methods thus allow for a computing system to continually approach the desired end state where no users ever have an entitlement unknowingly associated with their account that they no longer use or need, and where entitlements can be more aggressively culled when they are generally less needed, all without continued investment of human labor. Further, various machine learning techniques may be used to train on data of past revocations, challenges, and/or restorations, and to refine automated revocations or even detect anomalous use of entitlements.

A computer-implemented method and computing system are disclosed herein, for automatically managing entitlements for users or roles. The method comprises retrieving metadata concerning the one or more entitlements and the one or more users having those entitlements; selecting a first one or more instances of an entitlement and its user for revocation, and a second one or more instances of an entitlement and its user to be retained without revocation; automatically revoking access of the entitlements in the first one or more instances; and automatically notifying the users in the first one or more instances of the automatic revocation.

As previously mentioned, in one family of variants, revocations are performed via probabilistic sampling, while in another family of variants, revocation are performed based on a "use it or lose it" scheme. Further, machine learning techniques may be used to analyze the outcomes of prior revocation attempts and the prior use of entitlements by users and thereby to refine future revocations or identify anomalous usages of entitlements.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION OF THE DRAWINGS

Figure 1:
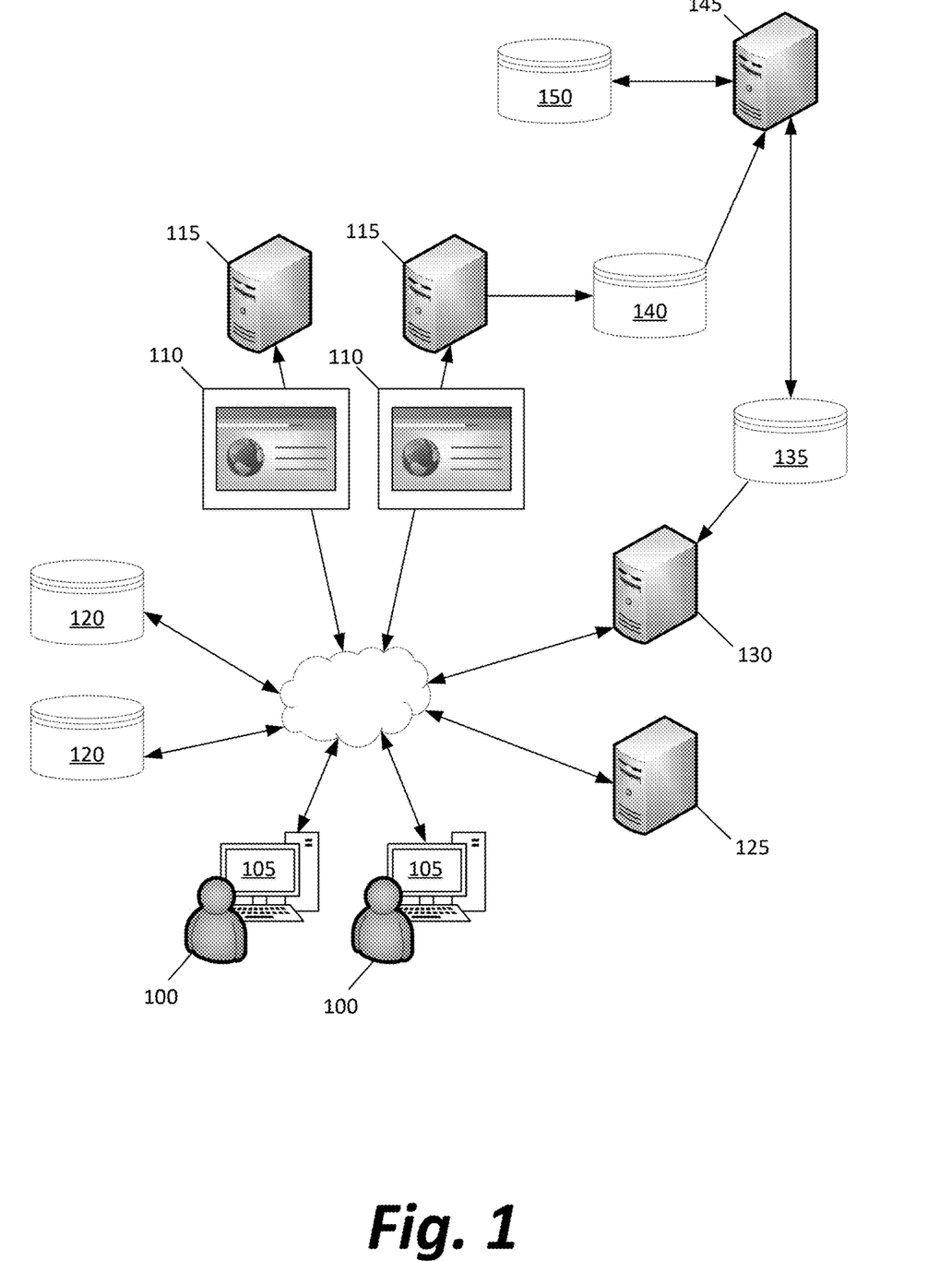
FIG. 1 depicts an example system of computing devices managing access entitlements for a number of users on an organization's computing network.

FIG. 1 depicts an example system of computing devices managing access entitlements for a number of users on an organization's computing network.

One or more users 100 use various computing devices 105 (such as a desktop computer, laptop computer, mobile computing device, or any other computing device) to access various applications 110 provided by servers 115, or various databases or other resources 120. In order to access them, the users 100 are first required to communicate with a credentials server 125, to verify their identity (whether via a password, multifactor authentication, biometric authentication, or other methods) and be issued a token or similar means of demonstrating identity to other devices in a network. In a preferred embodiment, Siteminder may be used for this purpose, to provide single sign-on functionality. Then, upon attempting to interact with an application 110 or another resource 120, an entitlements server 130 may be consulted to determine whether the given user is actually entitled to perform the desired action. In a preferred embodiment, the entitlements server 130 is administering the Sentinel API to manage data and entitlement access, but any other API or software for entitlement management might be chosen instead.

In a preferred embodiment, the entitlements server 130 is in communication with an entitlements storage 135 that tracks whether a particular user has a particular entitlement, and with an entitlements usage storage 140 that tracks and timestamps historical requests to utilize those entitlements. Thus, for example, the entitlements storage 135 might indicate that John Doe has the authority to access a particular web application, while the entitlements usage storage 140 may indicate that John Doe attempted to log into the particular web application on January 1 at 12:01 pm and on January 2 at 3:00 pm. In a preferred embodiment, the entitlements usage storage includes a number of logging sources, including web logs from Tomcat, Apache, or Proxy, and authentication logs from SiteMinder or OIDC PingFederate.

Finally, in a preferred embodiment, a systematic entitlement review server 145 is in communication with the entitlements server 130, with the entitlements storage 135, optionally with the entitlements usage storage 140, and with entitlements metadata storage 150. The systematic entitlement review server 145 will use a series of methods described further below to make automated decisions about revoking entitlements (by modifying data stored in the entitlements storage 135) based on the metadata stored in the entitlements metadata storage 150 (and possibly also based on entitlements usage data from the entitlements usage storage 140). It will also track a system of challenging revocations and restoring entitlements, or affirming revocations in response to challenges, in order to learn from these outcomes, refine revocation procedures and train machine learning classifiers or other systems in order to achieve a better balance between avoiding security risks and avoiding user inconvenience.

FIG. 1 depicts only one possible topology or arrangement of devices in a simplified manner, but ultimately, many different configurations for systems that embody the presently-disclosed innovations may exist apart from that which is depicted in FIG. 1.

For example, although a particular division of functions between devices is described here, other configurations are possible in which functions are divided among devices differently. All of the functions of the credentials server 125, the entitlements server 130, the systematic entitlement review server 145, and/or web application provisioning servers 115 might conceivably be integrated into a single server with multiple threads executing different software modules simultaneously. The entitlements storage 135, entitlements usage storage 140, entitlements metadata storage 150, and any other storage 120 might represent different tables, partitions, or folders within a single database, data lake, or other storage system.

Extending in the other conceptual direction, although several of these computing elements are described as if they are one computing device in a single location, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme.

Figure 2:
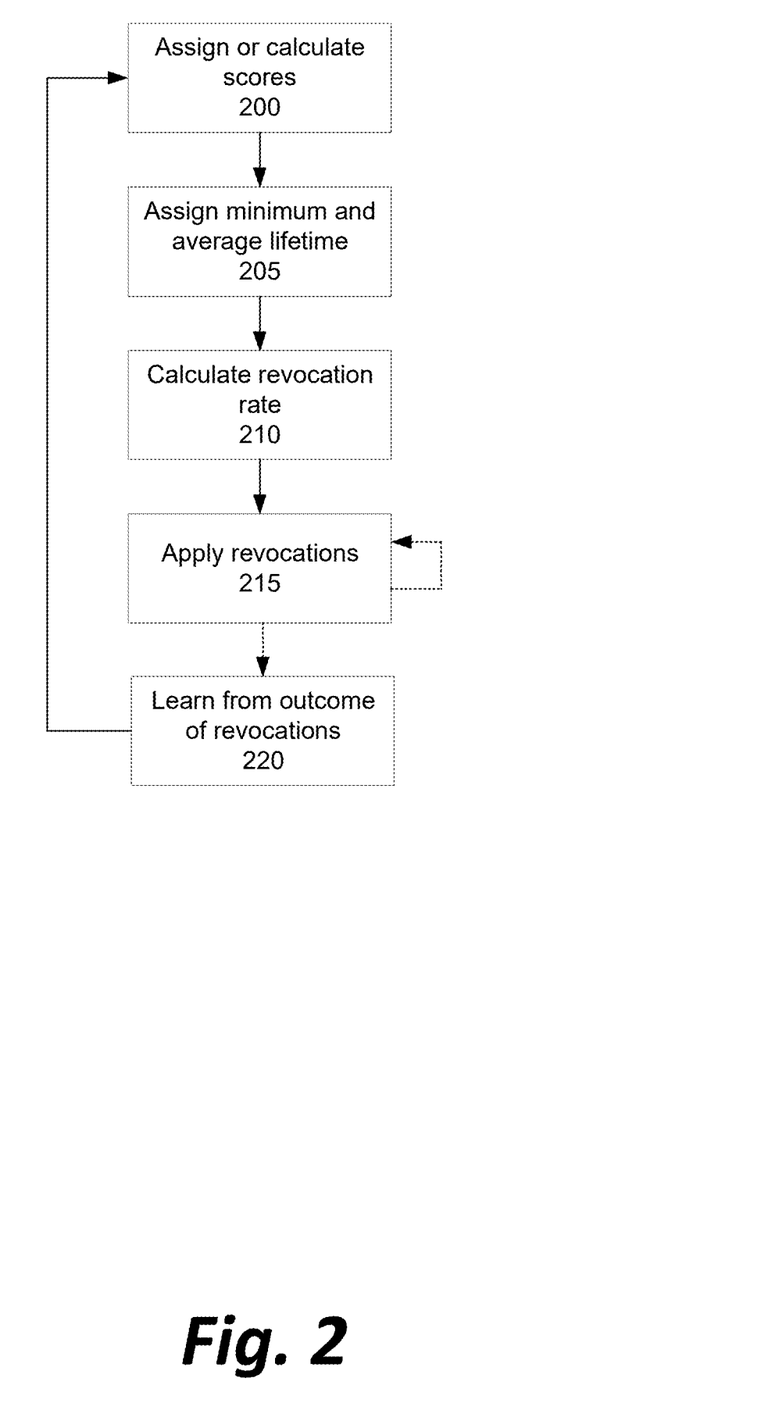
FIG. 2 depicts, in simplified flowchart form, a method of selecting entitlements for revocation in a probabilistic sampling scheme.

FIG. 2 depicts, in simplified flowchart form, a method of selecting entitlements for revocation in a probabilistic sampling scheme.

First, each existing entitlement in a system is assigned a score (Step 200). In a preferred embodiment, these scores range from 0 to 10, though other scoring systems can easily be envisioned. In this preferred scoring system, a 0 indicates that an entitlement should be permitted to persist long-term or indefinitely (whether because it is incapable of causing harm, or is so mission-critical it should never risk interruption, or another reason), and a 10 indicates that an entitlement should be revoked at the very first opportunity to do so (perhaps because it is deprecated).

The assignment of such scores can be either the result of a human choice, a machine learning classifier, or a hybrid (initial human choices or defaults, adjusted over time by reinforcement learning or reclassification by machine learning classifiers). In initial stages of implementing such a scoring system, it may be preferable to blindly assign every entitlement a score of 5 unless a human analyst feels that a higher or lower score is warranted. After initial scoring determinations have been made or assigned by default, scores can be adjusted over time in a number of ways. One possible means is a small adjustment upward made every time a revocation is accepted without a challenge, and a small adjustment downward made every time a revocation is challenged and the challenge is approved, as will be described further below. Ideally, over time, an equilibrium will be reached where entitlements that are often needed and whose revocations are often challenged will be rarely revoked in the future, and entitlements whose revocations are rarely challenged are revoked all the more often.

Alternatively, scores may be initially assigned or adjusted by means of a machine learning algorithm that predicts an appropriate score based on a variety of factors, such as the systems affected by an entitlement; the scores assigned in the past or currently to similar entitlements; a historical log of revocations or challenges to revocations of similar entitlements, and so on. For example, training data may indicate that multiple existing entitlements for "Web App #1" are in the range from 0-2, and multiple existing entitlements related to data export in other web apps are in the range from 5-6. If a data export entitlement is added to Web App #1, it is likely to receive a score somewhere between those ranges (depending on whether the training data and any reinforcement learning the classifier has indicated to the classifier that one factor is more determinative than the other).

Various techniques for machine learning to assign scores to entitlements may include natural gradient boosting, feedforward, convolutional, recurrent, deep Q, or deep learning neural networks, reinforcement learning, ensemble models, decision tree classifiers, random forest, support vector machines, natural gradient boosting, and/or any other method of leveraging a multi-dimensional training data set into a system for classifying new or updated data samples in real time.

Once a score has been assigned to or calculated for an entitlement, an associated minimum lifespan and an average additional lifespan are calculated (Step 205). In one preferred embodiment, a score of 0 will correspond to a minimum lifespan of three years, with no automatic revocation after that point, such that the total lifespan is indefinite. A score of 5 will still correspond to a minimum lifespan of three years, but with an intended average additional lifespan of approximately two years, so that some instances of the entitlement are revoked at three years, some at five years, and some at seven years or more. A score of 10 will correspond to immediate revocation.

Figure 3A:
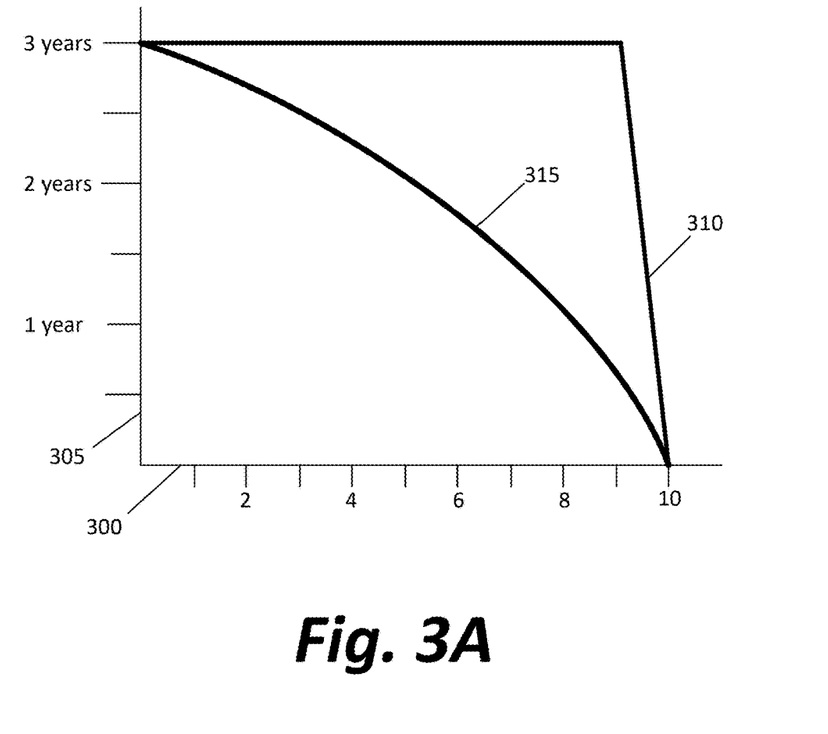
FIG. 3A depicts an example graph relating an entitlement score to an intended minimum and average additional lifetime for an instance of the entitlement.

FIG. 3A depicts a graph of two possible example functions representing these correspondences, with a score axis 300 being related to a duration axis 305 by means of the minimum lifespan function 310 and average additional lifespan function 315. As depicted here, for any entitlement with a score of nine or lower, the entitlement will always survive for a full three years, while an entitlement with a score of 10 will be revoked immediately. However, for those entitlements with a score greater than zero, they are increasingly likely to be revoked after the three-year lower limit. Any arbitrary functions for any arbitrary scoring system may be selected in alternative embodiments to result in a different distribution of entitlement revocations over time. Naturally, different minimum, average, or even maximum lifespans may be assigned in any given scoring system, depending on factors such as the sensitivity of the data that these entitlements apply to, expected employee turnover or reassignment, or any other factors; it may be that a three-year minimum or a two-year additional average is excessively conservative or aggressive for a particular organization's daily operations.

Next, the average lifespan is used to calculate an associated probability of revocation per unit of time (Step 210). In a preferred embodiment, the unit of time is one week, and new revocations randomly occur each week. Extending the example above, where a score of 5 indicates an average additional entitlement lifespan of approximately two years, an annual probability can be reverse-engineered from that average to be approximately 30%, and the weekly probability can then be calculated as approximately 0.58% per week (30% divided by 52). Ordinary principles of probability and algebra can be used to calculate a revocation probability per unit to time to achieve any desired probability distribution or behavior over a period of time. The probability of revocation per unit of time may be stored in the entitlement metadata storage 150 to be retrieved during the probabilistic sampling.

Figure 3B:
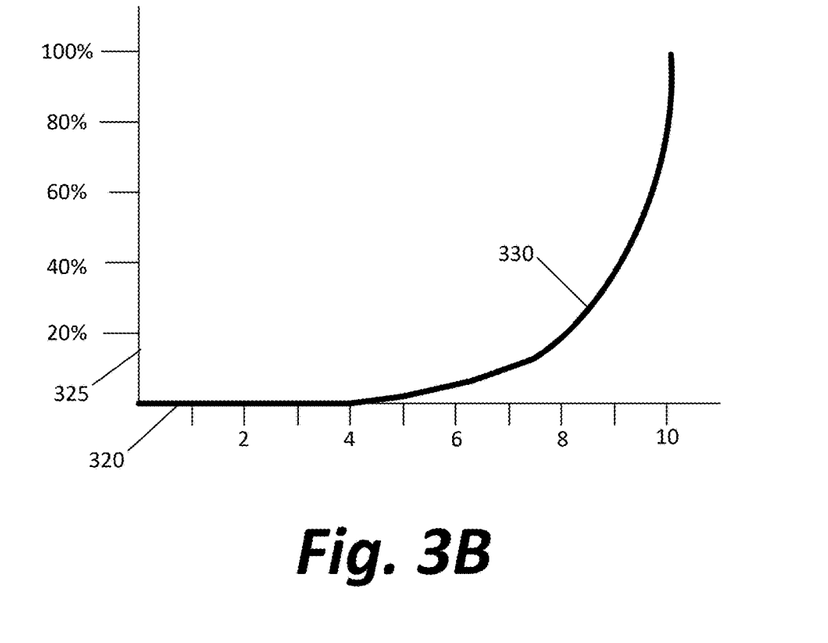
FIG. 3B depicts an example graph relating an entitlement score to an intended probability of revocation of an instance of the entitlement per unit of time.

FIG. 3B depicts a graph of a possible example function representing the results of this calculation, with a score axis 320 being related to a weekly probability of revocation axis 325 by means of this function 330. As previously mentioned, when the score is 0, the probability of revocation is 0%/week; when the score is 5, the probability of revocation is 0.58%/week; and when the score is 10, the probability of revocation is 100%/week.

Ultimately, some subset of user-entitlement pairs are selected and a revocation process is initiated (Step 215), which is discussed in further detail below and depicted in FIG. 4. In some embodiments, deciding to initiate a revocation may be as simple as looping through every user-entitlement pair in the entitlements storage 135, retrieving the minimum lifespan and probability of revocation per unit time for the entitlement from the entitlements metadata storage 140, and initiating revocation:

if any configuration rule has established a maximum lifespan for user-entitlement pairs or has established other criteria for automatic revocation that are met by the given user-entitlement pair; OR if the age of the user-entitlement pair is greater than the minimum lifespan; AND a randomly generated value between 0 and 1 is less than the retrieved or calculated probability of revocation.

In some instances, the retrieved or calculated probability of revocation may be adjusted for a particular user-entitlement pair before generating a random number to decide the entitlement's fate. Considerations may be configured based on a stored set of rules in the entitlements metadata, and may include such factors as whether a user's role or title has changed since the time that the entitlement was provided, whether the user's role or title has been associated to a greater or lesser extent with the entitlement by other users with the same role or title, whether there are negative or positive correlations between the entitlement and other entitlements held by the user, the user's past behavior in challenging revocations or accepting revocations, etc.

The initiation of revocation results in an update to data stored in either the entitlements storage 135 or the entitlements metadata storage 150, in order to indicate that a revocation will occur unless the automated process is short-circuited by a user challenge to the revocation, as will be discussed below.

If the automated revocation system does not yet have enough historical data to learn from and adjust entitlement scores, or if no machine learning framework has been set up to learn from such data, the automated revocation step will simply repeat for every unit of time passed, indefinitely (repeating Step 215).

If, instead, such training data and ability to use it has been configured, the outcome of each revocation process will be stored in the entitlements metadata storage 150 and used to train the machine learning classifier (Step 220). In a preferred embodiment, each final outcome throughout the history of all such attempts is classified into one of: an unchallenged revocation, a revocation whose challenge is overturned, a revocation whose challenge is sustained, or a past revocation that is reinstated at a later time. The first two of these outcomes will lead to positive reinforcement via an increase in the affected entitlement's score, while the latter two of these outcomes will lead to negative reinforcement and a decrease in the affected entitlement's score.

After training or reinforcement learning has been completed, entitlements can be re-examined and scores for each entitlement possibly re-calculated or adjusted (back to Step 200). In a preferred embodiment, this cycle will repeat once per week, indefinitely.

Figure 4:
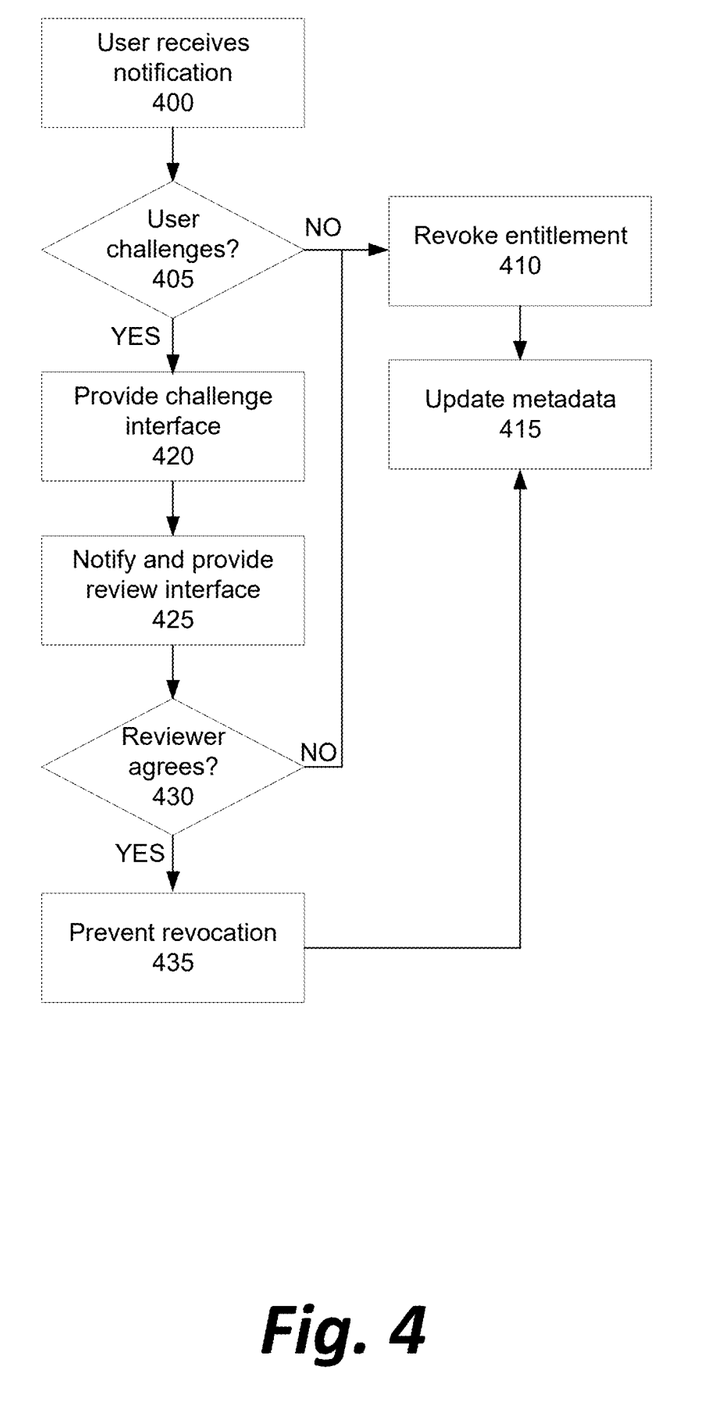
FIG. 4 depicts, in simplified flowchart form, a method of revoking an entitlement, once selected, and of challenging a revocation.

FIG. 4 depicts, in simplified flowchart form, a method of revoking an entitlement, once selected, and of challenging a revocation.

Although only the resolution of a single revocation is depicted here, it will be recognized that in a large organization, this procedure is being repeated in parallel for potentially thousands of user-entitlements, or more.

Once any given user-entitlement pair has been selected for revocation (as part of the recurring process depicted in FIG. 3), the user in question will receive a notification warning them that one or more entitlements have been flagged for revocation (Step 400). This warning may be in the form of a banner or pop-up on a user interface the user uses regularly or in association with a particular web application, or may be provided through a different medium, such as email, text/SMS, instant message, or other electronic communication.

If the user accepts this revocation or does not act within a predefined time limit (Step 405), the revocation will simply occur (Step 410) and the entitlements metadata will be updated (Step 415) to include the fact that a revocation of this entitlement was not challenged (likely leading to an increase of the entitlement's score in a future re-scoring of all entitlements).

If, instead, the user wishes to challenge the revocation, the user will be provided a user interface (Step 420) in which to provide a justification for continued access to the entitlement.

The challenge is reported (Step 425) to a supervisor or other operator who is able to use a user interface to review the user, the entitlement, and the user's justification for retaining the entitlement. The report of the challenge may likewise be in the form of a pop-up or notification on a user interface the supervisor uses regularly or in association with a particular web application, or may be provided through a different medium, such as email, text/SMS, instant message, or other electronic communication.

If the supervisor or other operator agrees with the user (Step 430), the revocation will not occur (Step 435) and the entitlements metadata will be updated (Step 415) to include the fact that a revocation of this entitlement was successfully challenged (likely leading to a decrease of the entitlement's score in a future re-scoring of all entitlements).

If the supervisor or other operator disagrees with the user, the revocation will still occur and the entitlements metadata will be updated (Step 415) to include the fact that a revocation of this entitlement was unsuccessfully challenged (likely leading to an increase of the entitlement's score in a future re-scoring of all entitlements, though depending on the embodiment the increase may be less or otherwise be treated differently from a revocation that was not challenged at all).

In some embodiments, other steps may be introduced, such as permitting the supervisor or other operator to pause the revocation process without sustaining the challenge, because the challenge requires more investigation; or introducing additional levels of approval before sustaining a challenge; or letting a user appeal an unsuccessful challenge, etc. Additional final outcomes or paths through such a process may be stored in the entitlements metadata to provide even more granular training data for a machine learning system to use in developing an understanding of how truly important an entitlement may be to one or more users.

In a preferred embodiment, the depicted feedback loop operates smoothly without any overlap between instances of revocation and feedback, because the assessment frequency is once per week and the duration during which a revocation will be resolved one way or another is also one week. However, in other embodiments, the frequency and duration may not coincide, and it is imaginable that multiple revocation processes may be at different stages, in parallel, or that there is significant downtime before the completion of one round of revocations and the initiation of the next round.

In a preferred embodiment, the cycle and time limits are set such that before every Monday, most likely late on Friday or Saturday, entitlements are selected for revocation; every Monday, users are notified of the impending revocation; every Wednesday will be the deadline for responding to a revocation; every Thursday will have unchallenged revocations begin to go into effect; and revocations will become final before following Monday.

In parallel to or as an alternative to the probabilistic cancelling scheme, as mentioned above, a "use it or lose it" scheme may be applied to remove entitlements in response to lack of user utilization of any given entitlement.

Figure 5:
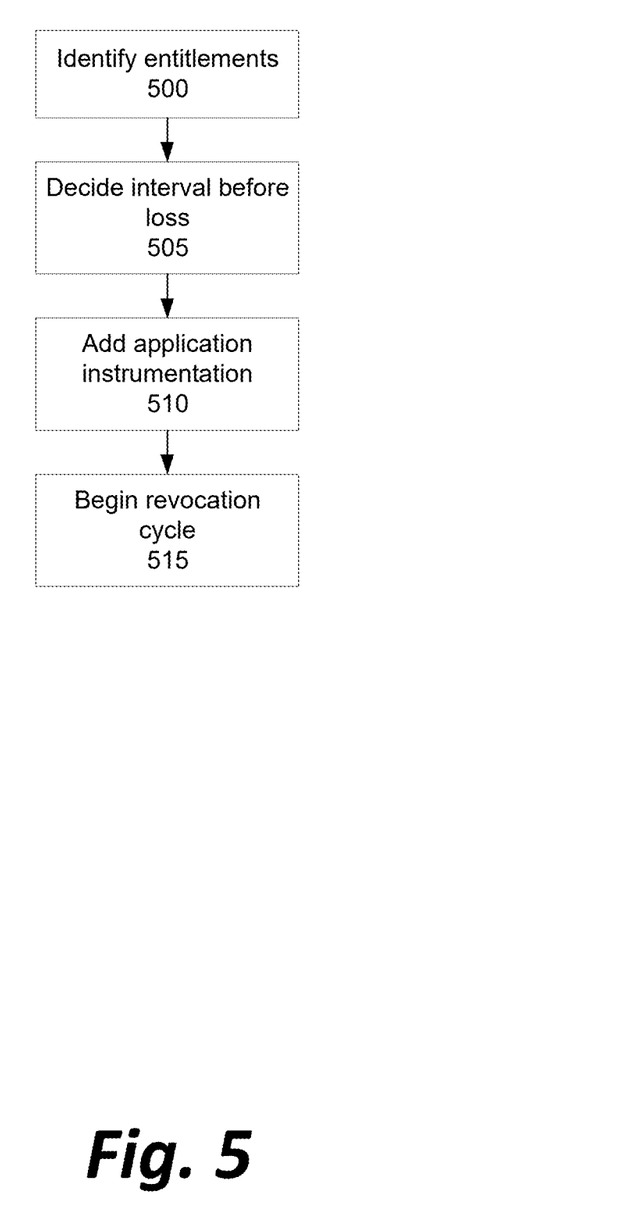
FIG. 5 depicts, in simplified flowchart form, a method of preparing applications to be compatible with and provide necessary data for a "use it or lose it" revocation scheme.

FIG. 5 depicts, in simplified flowchart form, a method of preparing applications to be compatible with and provide necessary data for a "use it or lose it" revocation scheme.

First, it is determined which entitlements associated with an application should be subject to a "use it or lose it" regime (Step 500). In some cases, a long interval without usage does not indicate that the entitlement is not actually needed. For example, a user may only need access to a particular error log when a system goes down, and the system normally has such a low rate of downtime that the user only needs to consult the error log once a year, or even less frequently. In other cases, the stakes involved with a particular entitlement may be so low In still other cases, an entitlement may currently be shared with such a small set of people and be associated with a sufficiently critical system that automatic revocation of the entitlement from any individual, even if rectified quickly, would risk inability to deal with a crisis situation. If a revocation might lead to the only person on-call to deal with an issue finding themselves unable to do so, the entitlement should never be subject to automatic revocation.

Next, if an entitlement will be subject to possible automatic revocation, the interval of disuse before triggering the revocation must be configured (Step 505). In many cases, a default value of six months may strike a good balance between avoiding annoyance to legitimate users and avoiding an abandoned entitlement remaining in existence for too long. In other cases, a longer duration may be selected to be more conservative or allow for rarer "corner case" entitlements, or a shorter duration may be selected to be more aggressive and deal with use cases where, if the entitlement is used legitimately at all, it will likely be used often. Selection of an interval may be automated and take into account prior revocation and restoration data for similar entitlements, or may be selected by a human user.

The applications affected, as well as related applications, are then modified to log when an entitlement is being used directly, or when steps associated with entitlement use are taken (Step 510). For example, if the credentials server 125 is being used to log into a given application, a trigger should be added in the software to log that the user was authenticated for that application (and presumably will begin using entitlements related to that application). Similar triggers may be added to the application itself, logging all user actions or some specific subset of them, such as downloading a resource, interacting with an API, and so on. In a preferred embodiment, a queue such as Apache Kafka is used to receive usage events as they occur and to store them until they can be pre-processed to add any necessary metadata and placed into long term storage such as Parquet files that can be accessed by Splunk queries or similar querying systems.

Once application instrumentation has been added, the systematic entitlement review server 145 can begin reviewing output from the application in the logs (Step 515) and can begin making revocation decisions on a "use it or lose it" basis, as well as reviewing justifications for past challenges to probabilistic revocations, if any, as discussed further below in association with FIGS. 6 and 7.

Figure 6:
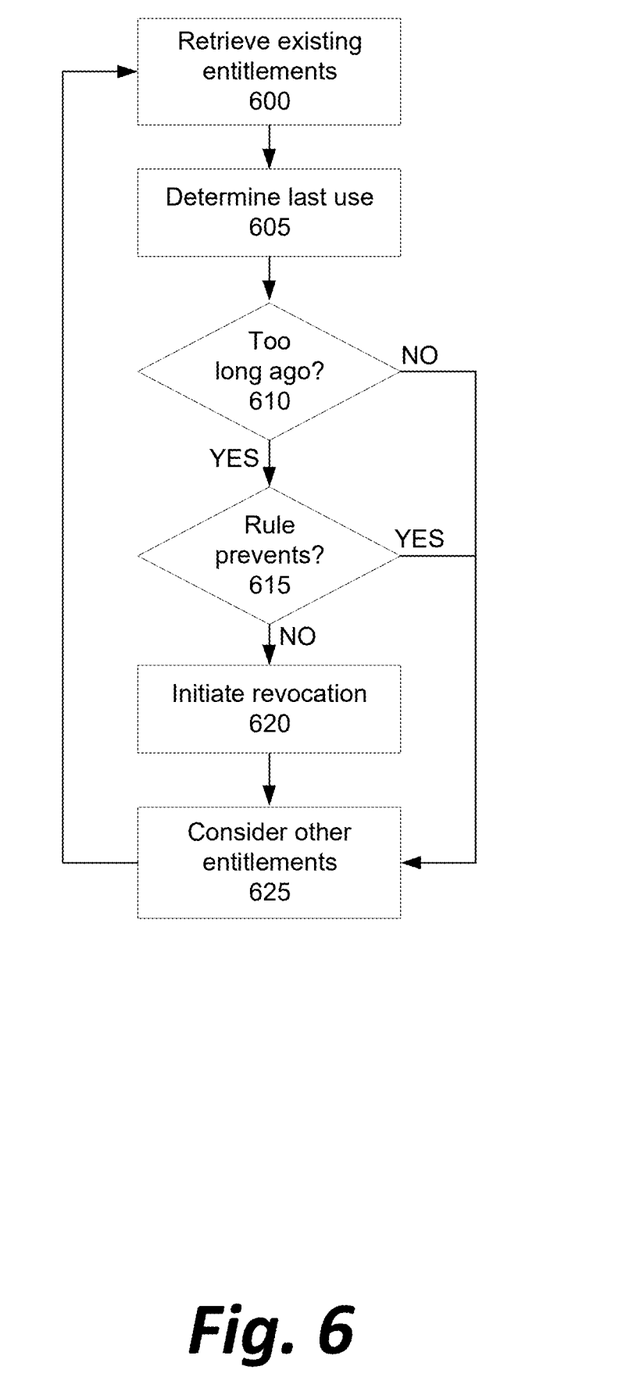
FIG. 6 depicts, in simplified flowchart form, a method of selecting entitlements for revocation in a "use it or lose it" scheme.

FIG. 6 depicts, in simplified flowchart form, a method of selecting entitlements for revocation in a "use it or lose it" scheme.

As an initial step, each user-entitlement pair is retrieved from the entitlements storage 135 (Step 600).

The entitlements usage storage 140 is then queried to determine how long it has been since the given user last utilized the given entitlement (Step 605). Alternatively, the duration may be generalized to the last time the user used a given application, regardless of what entitlement was involved in that use, or the last time the user logged into a given server, regardless of what applications are stored on that server, etc.

If the duration since the last usage is sufficiently long (Step 610), and if there is no rule-based configuration in the entitlement metadata storage 150 preventing the revocation of the given entitlement for the given user (Step 615), then the revocation process will be initiated for the given user (Step 620). In a preferred embodiment, the default duration of time for revoking an entitlement will be six months, though naturally, many different systems may be configured to have different default durations, and even within a single system, each entitlement might conceivably be assigned a different duration. Examples of rules that might be stored in the entitlement metadata might include that users with a given role or title should not have the given entitlement revoked, that users with a given role or title should be given a grace period compared to the default, or a stricter period compared to the default, etc.

After the currently considered pairing of user and entitlement has been examined, the next pairing is considered (Step 625). After all pairings have been considered, and after a period of time has passed, such that more entitlements may have reached their expiration date without usage, the flow returns to its beginning to re-assess which entitlements should be revoked at the later time (back to Step 600).

In a preferred embodiment, whenever an entitlement is revoked based on duration without usage, it proceeds through the same series of steps depicted in FIG. 4, for notification, possible challenge, and possible sustaining or overruling of the challenge. These outcomes will likewise be stored in the entitlements metadata 150, and may be used to inform future changes in the duration before revocation, via similar machine learning techniques. Entitlements with frequently challenged revocations may have their durations extended, entitlements with seldom challenged revocations may have their durations shortened, correlations between information concerning users or sets of users and the success of their challenges may be used to establish new rule-based configurations or allow machine learning to suggest optimal changes to the durations, etc.

Figure 7:
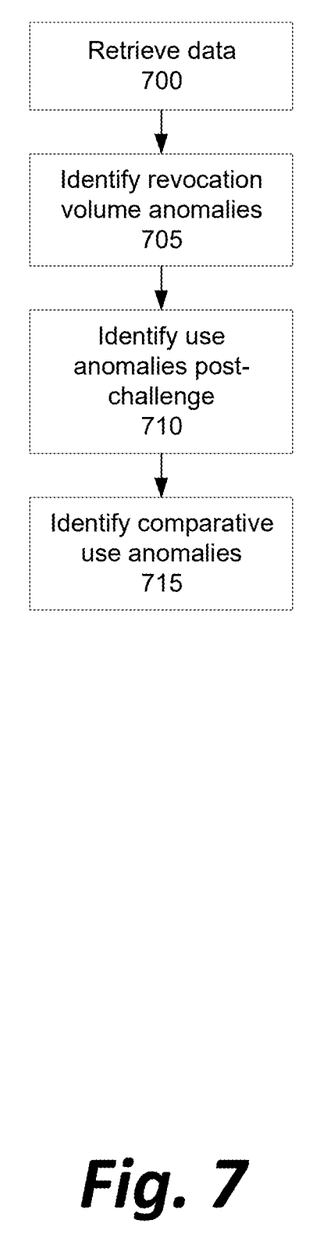
FIG. 7 depicts, in simplified flowchart form, a method of identifying and responding to anomalous usage of entitlements.

FIG. 7 depicts, in simplified flowchart form, a method of identifying and responding to anomalous usage of entitlements.

An anomaly detection module in the systematic entitlement review server 145 or another server may routinely retrieve data from one or more of the entitlements storage 135, entitlements usage storage 140, and the entitlements metadata storage 150 (Step 700). This data may be used to periodically perform a number of sanity-checking or review steps on the data stored therein. When an anomaly is detected, various responses are possible depending on the nature of the anomaly.

First, data on total revocations by entitlement, by application, and/or by groups of users may be vectorized and subjected to classification via clustering and/or determination of a probability that the revocations are anomalous, compared to prior batches of revocations (Step 705).

If revocations are being reversed at an exceptionally high rate, it may indicate in a probabilistic sampling regime that the probabilities being determined are too high and scores should be decreased. It may indicate in a "use it or lose it" regime that there is a problem with logging and that legitimate user activity is not being recorded accurately, so that the system incorrectly believes that an entitlement remains unused. Similarly, abnormally low revocations may indicate a scoring problem or that false logging entries are being generated.

Data on past challenges to revocations, outcomes of those challenges, and subsequent use of entitlements may be cross-checked and compared using various machine learning and natural language processing techniques (Step 710).

If there is a mismatch between an entitlement revocation challenge and the actual subsequent lack of use of an entitlement, it may indicate that a user is not being honest about that entitlement's necessity and a revocation should occur. Natural language processing may be applied to the textual reason supplied by the user to determine whether it refers to resources or roles that are not actually applicable or relevant to that user.

Data on use of entitlements in general may be vectorized and clustered or otherwise classified for each user in comparison to other users as a whole or other users having a same role or class (Step 715).

If there is a mismatch between entitlement use data for one user and for other users in a similar role or class, it may indicate that the user is undertaking duties improperly (whether that is accessing resources that the user does not need, or performing legitimate tasks but in a way different from how they were trained to perform). Entitlement use data may exhibit anomalies in terms of which resources have been accessed, what times of day or what days of the week those accesses occurred, and/or other metadata such as the location, the particular device used, the network used, the application or operating system on the user's device, and so on.

Any of these anomalies may be responded to via automatic revocation of an entitlement, automatic halting of future revocations for a particular entitlement or for all entitlements, automatic beginning of a revocation process but permitting a user challenge to the revocation, automatic cancellation of a revocation process that is currently pending, or by notifying a supervisor or other individual having authority to change or revoke entitlements, as appropriate.

Computing Devices Generally

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 8, below, describes various enabling devices and technologies related to the physical components and architectures described above.

Figure 8:
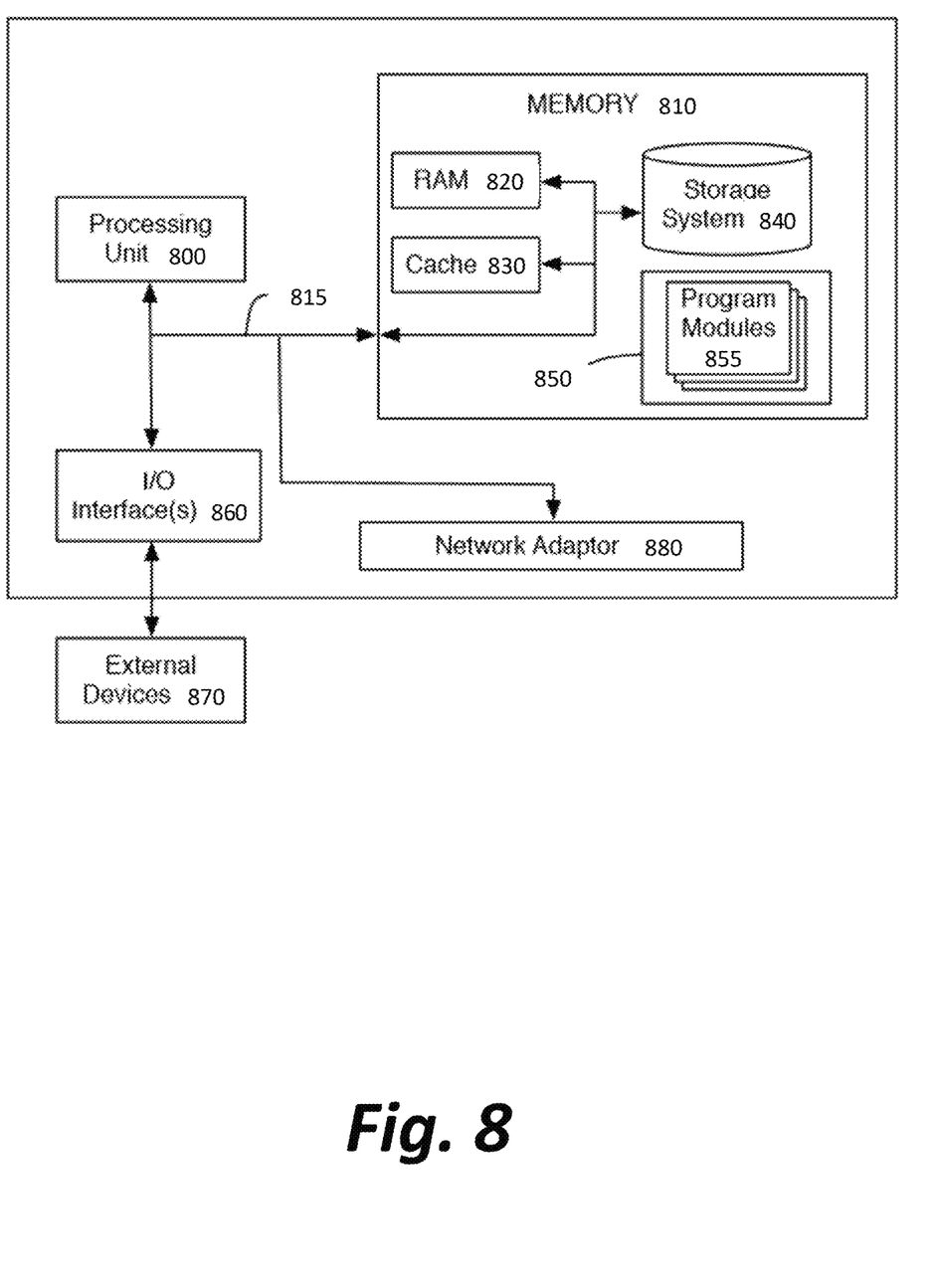
FIG. 8 is a high-level block diagram of a representative computing device that may be utilized to implement various features and processes described herein.

FIG. 8 is a high-level block diagram of a representative computing device that may be utilized to implement various features and processes described herein, for example, the functionality of the credentials server 125, the entitlements server 130, the systematic entitlement review server 145, the web application provisioning servers 115, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computing device is illustrated in the form of a special purpose computer system. The components of the computing device may include (but are not limited to) one or more processors or processing units 800, a system memory 810, and a bus 815 that couples various system components including memory 810 to processor 800.

Bus 815 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 800 may execute computer programs stored in memory 810. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 800 may be used.

The computing device typically includes a variety of computer system readable media. Such media may be any available media that is accessible by the computing device, and it includes both volatile and non-volatile media, removable and non-removable media.

System memory 810 can include computer system readable media in the form of volatile memory, such as random access memory (RAM) 820 and/or cache memory 830. The computing device may further include other removable/non-removable, volatile/non-volatile computer system storage media. By way of example only, storage system 840 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 815 by one or more data media interfaces. As will be further depicted and described below, memory 810 may include at least one program product having a set (e.g., at least one) of program modules that are configured to carry out the functions of embodiments described in this disclosure.

Program/utility 850, having a set (at least one) of program modules 855, may be stored in memory 810 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 870 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 860.

In addition, as described above, the computing device can communicate with one or more networks, such as a local area network (LAN), a general wide area network (WAN) and/or a public network (e.g., the Internet) via network adaptor 880. As depicted, network adaptor 880 communicates with other components of the computing device via bus 815. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for performing automated systematic entitlement review, comprising:
   a data store tracking one or more software entitlements available to one or more users;
   a server enforcing the one or more entitlements by permitting or denying access to the one or more users to perform one or more given tasks; and
   non-transitory memory storing instructions that, when executed by a computer processor, cause the computer processor to:
   retrieve metadata concerning the one or more entitlements and the one or more users having those entitlements;
   generate a numerical score for assigning to each of the one or more entitlements;
   determine a probability of revocation for each user having each of the one or more entitlements, according to the numerical score assigned to each of the one or more entitlements;
   select a first one or more instances of an entitlement and its user for revocation, and a second one or more instances of an entitlement and its user to be retained without revocation;
   for each entitlement and for each user having that entitlement, use random number generation to revoke that entitlement for that user with a probability equal to the determined probability of revocation;

automatically revoke access of the entitlements in the first one or more instances; and automatically notify the users in the first one or more instances of the automatic revocation.

2. The system of claim 1, wherein the non-transitory memory stores instructions that, when executed by a computer processor, further causes the computer processor to:

determine the probability of revocation as a constant probability of revocation per interval of time, such that after a recurrence of periodic probabilistic revocations, a predetermined probability of revocation over a longer time interval is achieved.

3. The system of claim 1, wherein the non-transitory memory stores instructions that, when executed by a computer processor, further causes the computer processor to:

based at least in part on one or more users' responses to revocation of entitlements, regenerate an updated score for each entitlement, such that a challenged revocation makes future revocations less probable, and an unchallenged revocation makes future revocations more probable.

4. The system of claim 1, further comprising a data store tracking timestamped instances of each use of the one or more entitlements by each user possessing the entitlement, and wherein the non-transitory memory stores instructions that, when executed by a computer processor, further causes the computer processor to: revoke an entitlement from a user based at least in part on a predetermined duration of time having elapsed since a most recent use of the entitlement.

5. The system of claim 1, wherein a user interface is provided to allow an affected user to challenge a revocation of that user's entitlement.

6. The system of claim 5, wherein a user interface is provided to allow restoration of the entitlement subsequent to a challenge.

7. The system of claim 6, wherein restoration only occurs if permitted after review by a user different from the user affected by the revocation.

8. The system of claim 1, wherein an automated machine learning agent is used to determine expected entitlements for a particular user based on entitlements currently granted to users different from the particular user.

9. The system of claim 1, wherein an automated machine learning agent is used to determine whether a particular user's actual use of entitlements is anomalous, compared to use of entitlements by users different from the particular user.

10. A computer-implemented method for performing automated systematic entitlement review, comprising:

retrieving metadata concerning the one or more entitlements and the one or more users having those entitlements;

generating a numerical score for assigning to each of the one or more entitlements;

determining a probability of revocation for each user having each of the one or more entitlements, according to the numerical score assigned to each of the one or more entitlements;

selecting a first one or more instances of an entitlement and its user for revocation, and a second one or more instances of an entitlement and its user to be retained without revocation;

for each entitlement and for each user having that entitlement, using random number generation to revoke that entitlement for that user with a probability equal to the determined probability of revocation;

automatically revoking access of the entitlements in the first one or more instances; and automatically notifying the users in the first one or more instances of the automatic revocation.

11. The method of claim 10, further comprising:

determining the probability of revocation as a constant probability of revocation per interval of time, such that after a recurrence of periodic probabilistic revocations, a predetermined probability of revocation over a longer time interval is achieved.

12. The method of claim 10, further comprising:

based at least in part on one or more users' responses to revocation of entitlements, regenerate an updated score for each entitlement, such that a challenged revocation makes future revocations less probable, and an unchallenged revocation makes future revocations more probable.

13. The method of claim 10, further comprising:

revoking an entitlement from a user based at least in part on a predetermined duration of time having elapsed since a most recent use of the entitlement.

14. The method of claim 10, wherein a user interface is provided to allow an affected user to challenge a revocation of that user's entitlement.

15. The method of claim 14, wherein a user interface is provided to allow restoration of the entitlement subsequent to a challenge.

16. The method of claim 15, wherein restoration only occurs if permitted after review by a user different from the user affected by the revocation.

17. The method of claim 10, wherein an automated machine learning agent is used to determine expected entitlements for a particular user based on entitlements currently granted to users different from the particular user.

18. The method of claim 10, wherein an automated machine learning agent is used to determine whether a particular user's actual use of entitlements is anomalous, compared to use of entitlements by users different from the particular user.

* * * * *